United States Patent [19]

Schnarch

[11] Patent Number: 4,884,882

[45] Date of Patent: Dec. 5, 1989

[54] APPARATUS FOR POSITIONING OPTICAL ELEMENTS

[75] Inventor: Benjamin Schnarch, Bat Yam, Israel

[73] Assignee: Israel Aircraft Industries Ltd., Lod, Israel

[21] Appl. No.: 219,405

[22] Filed: Jul. 15, 1988

[30] Foreign Application Priority Data

Jul. 16, 1987 [IL] Israel ............................ 83219

[51] Int. Cl.4 ............................................. G02B 5/08
[52] U.S. Cl. ................................. 350/634; 350/632; 350/633; 350/636; 248/487
[58] Field of Search ............... 350/632, 633, 634, 636; 248/487

[56] References Cited

U.S. PATENT DOCUMENTS 3,552,836  1/1971  Oskam .................................. 350/636
4,247,172  1/1981  Wunsch et al. ..................... 350/636

Primary Examiner—Bruce Y. Arnold
Assistant Examiner—Jay Ryan
Attorney, Agent, or Firm—Finnegan, Henderson, Farabow, Garrett & Dunner

[57] ABSTRACT

Apparatus for precise rapid orientation of an optical element comprising apparatus for supporting an optical element for rotation about a first axis, apparatus for selectably positioning the optical element about the first axis and including a rotatable cam having a cam surface, a dimension of which varies along its extent and determines the position of the optical element about the first axis; a step motor for determining the rotational orientation of the rotatable cam and thus determining which portion thereof is in operative engagement with the optical element for positioning thereof; and apparatus for interconnecting the rotatable cam with the step motor and comprising a flexible coupling.

18 Claims, 3 Drawing Sheets

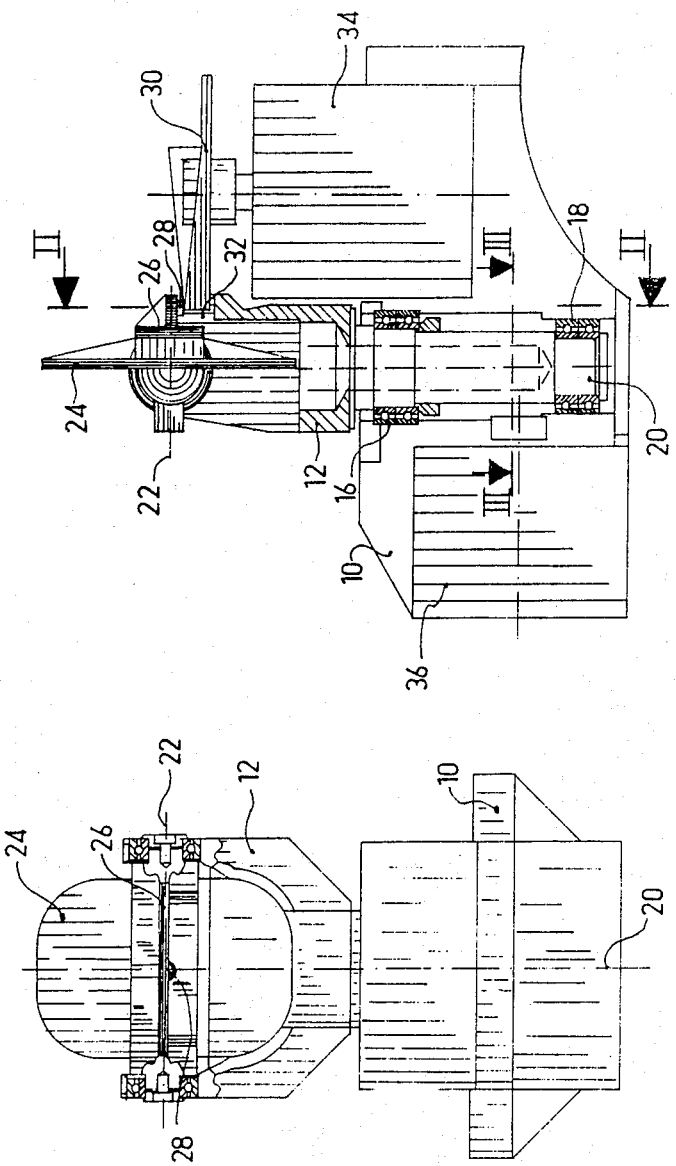

APPARATUS FOR POSITIONING OPTICAL ELEMENTS

FIELD OF THE INVENTION

The present invention relates to optical apparatus generally and more particularly to apparatus for precisely positioning an optical element along a desired line of sight.

BACKGROUND OF THE INVENTION

There exist in various applications requirements for accurate and speedy orientation of an optical element, such as a mirror in one of a plurality of orientations. Existing devices employing torquers and closed loop position sensing apparatus are limited in speed and accuracy.

SUMMARY OF THE INVENTION

The present invention seeks to provide improved apparatus for orientation of an optical element, which provides highly accurate and rapid positioning notwithstanding significant acceleration forces.

There is thus provided in accordance with a preferred embodiment of the present invention apparatus for precise rapid orientation of an optical element comprising apparatus for supporting an optical element for rotation about a first axis, apparatus for selectably positioning the optical element about the first axis and including a rotatable cam having a cam surface, a dimension of which varies along its extent and determines the position of the optical element about the first axis; a step motor for determining the rotational orientation of the rotatable cam and thus determining which portion thereof is in operative engagement with the optical element for positioning thereof; and apparatus for interconnecting the rotatable cam with the step motor and comprising a flexible coupling.

Additionally in accordance with a preferred embodiment of the present invention, the rotatable cam is in the form of a generally circular ring of varying width.

Further in accordance with a preferred embodiment of the present invention, the apparatus for interconnecting comprises radially extending leaf springs connecting the generally circular ring to a mounting hub associated with the step motor.

In accordance with a preferred embodiment of the present invention, the apparatus for precise rapid orientation of an optical element operates in three dimensions and also comprises apparatus for supporting an optical element for rotation about a second axis, apparatus for selectably positioning the optical element about the second axis and including a rotatable cam having a cam surface, a dimension of which varies along its extent and determines the position of the optical element about the second axis; a step motor for determining the rotational orientation of the rotatable cam and thus determining which portion thereof is in operative engagement with the optical element for positioning thereof; and apparatus for interconnecting the rotatable cam with the step motor and comprising a flexible coupling.

The second axis is preferably perpendicular to the first axis.

BRIEF DESCRIPTION OF THE DRAWINGS

The present invention will be understood and appreciated more fully from the following detailed description, taken in conjunction with the drawings in which:

FIG. 1 is a partially cut away side view illustration of apparatus constructed and operative in accordance wih a preferred embodiment of the present invention;

FIG. 2 is a partially cut away side view of part of the apparatus of FIG. 1, taken along the lines II—II shown in FIG. 1;

FIG. 3 is a sectional illustration of part of the apparatus of FIG. 1, taken along the lines III—III shown in FIG. 1;.

DETAILED DESCRIPTION OF A PREFERRED EMBODIMENT

Figures 4, 5:
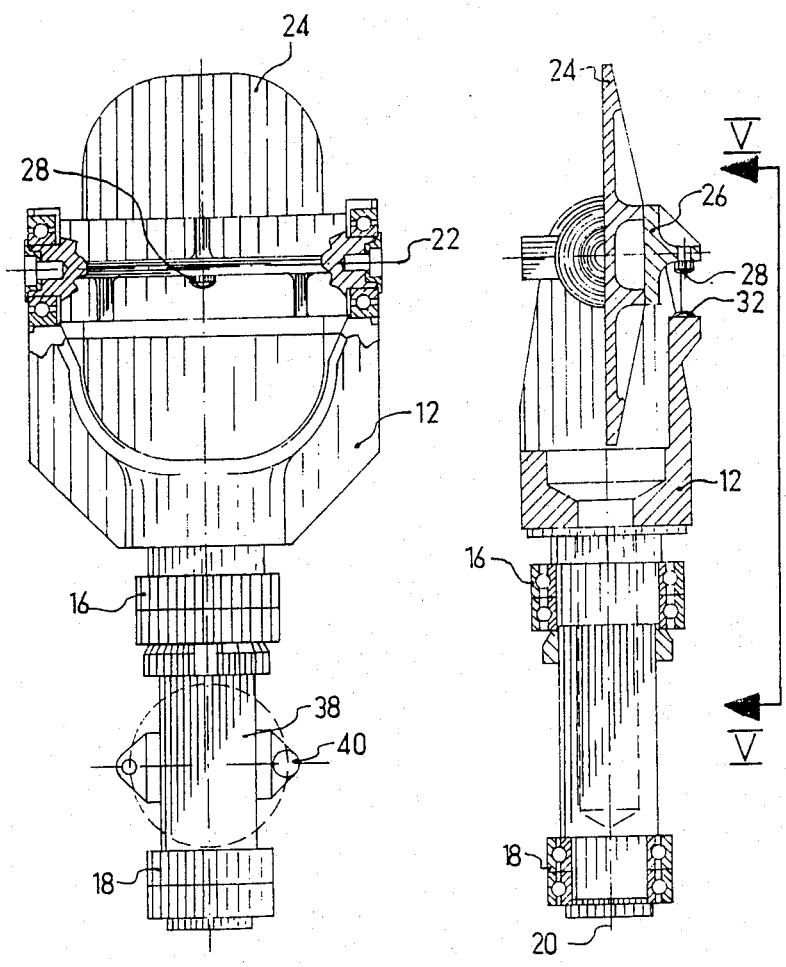
FIG. 4 is a sectional illustration of a portion of the apparatus seen in FIG. 1.
FIG. 5 is a partially cut way illustration taken along the lines V—V in FIG. 4.

Reference is now made to FIGS. 1–7, which illustrate an optical system comprising a base 10, and a gimbal assembly 12, rotatably mounted on base 10 by means of bearings 16 and 18 for rotation about a rotation axis 20. Gimbal assembly 12 defines a rotatable mounting axis 22 about which is rotatably mounted thereon an optical element 24, normally an optical mirror.

Disposed behind mirror 24 is a support and displacement assembly 26 including a precisely dimensioned and positioned engagement protrusion 28. A rotatable cam 30, preferably in the form of a circular ring of varying width is interposed between engagement protrusion 28 and an engagement surface 32 of gimbal assembly 12. Mirror 24 is normally biased, as by a spring, not shown, so as to urge engagement protrusion 28 towards engagement surface 32.

It may be appreciated that the width of that portion of the rotatable cam 30 which is interposed between engagement protrusion 28 and engagement surface 32 determines the precise orientation of mirror 24 about axis 22. Selection of the desired orientation of mirror 24 about axis 22 may thus be effected by suitable rotational orientation of rotatable cam 30, which is effected by operation of a positioning motor 34, preferably a conventional electrical step motor.

According to a preferred embodiment of the invention, determiation of the precise orientation of mirror 24, and in fact, of gimbal assembly 12, about axis 20 is provided by an electrical step motor 36 in association with a rotatable cam 38 in much the same way as described hereinabove. In this case, an engagement protrusion 40 is fixedly attached to the shaft 42 of gimbal assembly 12, as by a mounting assembly 44. The engagement protrusion 40 is biased, as by a suitable spring, not shown, towards a fixed engagement surface 46, which may be fixedly mounted onto base 10. Rotatable cam 38, which may be similar in all relevant respects to rotatable cam 30, described above, is interposed between engagement protrusion 40 and fixed engagement surface 46 determining the orientation of shaft 42 adn or mirror 24 about axis 20, which is preferably perpendicular to axis 22.

Figure 7:
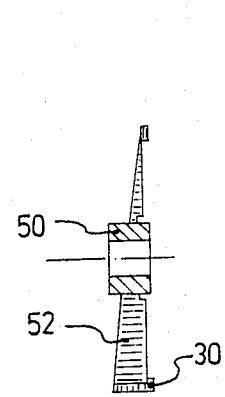
FIG. 7 is a sectional illustration of the rotatable cam of FIG. 6, taken along the lines VII—VII in FIG. 6.
Figure 6:
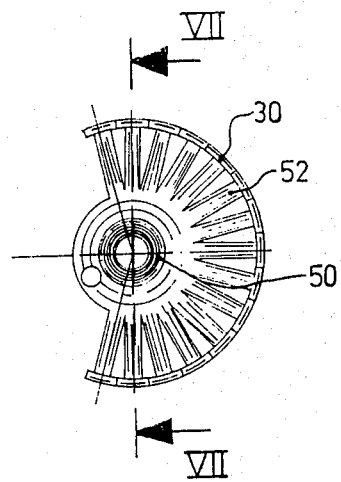
FIG. 6 is a partial illustration of a rotatable cam assembly employed in the apparatus of FIG. 1.

Reference is now made to FIGS. 6 and 7 which illustrate particular features of construction of the rotatable cam employed in accordance with a preferred embodiment of the present invention. Rotatable cam 30 is in the form of a ring of varying width, as seen clearly in FIG. 7. Normally the variation in width of the cam is monotonic and preferably the variation in width is linear.

Cam 30 is mounted onto a hub 50 by means of a plurality of radially extending spring spokes 52 which are characterized by flexibility in directions parallel to the axis of rotation of the cam 30. This flexibility enables cam 30 to function properly and provide extremely high accuracy positioning of mirror 24 notwithstanding very high accelerations applied to the rotating drive mechanism, in view of the fact that the position of the mirror is determined soley by the width of the cam between the engagement protrusion and the engagement surface. The flexibility of the spokes 52 eliminates an influence due to changes in position of the drive mechanism relative to the cam.

It is a particular feature of the present invention that extremely high accuracy of positioning is realized at extremely high speeds, notwithstanding a hostile operational environment in terms of acceleration and thermal conditions.

It will be appreciated by persons skilled in the art that the present invention is not limited by what has been particularly shown and described hereinabove. Rather the scope of the present invention is defined only by the claims which follow:

I claim:

1. Apparatus for precise rapid orientation of an optical element comprising:
    means for supporting an optical element for rotation about a first axis; and
    means for selectably positioning the optical element about the first axis and including:
        a rotatable cam having a cam surface, a dimension of which varies along its extent and determines the position of the optical element about the first axis, said rotatable cam comprising a generally circular ring of varying width;
        a motor for determining the rotational orientation of the rotatable cam and thus determining which portion thereof is in operative engagement with the optical element for positioning thereof; and
        means for interconnecting the rotatable cam with the motor.

2. Apparatus according to claim 1 and wherein said means for interconnecting comprises radially extending leaf springs connecting the generally circular ring to a mounting hub associated with the motor.

3. Apparatus according to claim 2 and also comprising:
    means for supporting the optical element for rotation about a second axis;
    means for selectably positioning the optical element about the second axis and including:
        a second rotatable cam having a cam surface, a dimension of which varies along its extent and determines the position of the optical element about the second axis;
        a second motor for determining the rotational orientation of the second rotatable cam and thus determining which portion thereof is in operative engagement with the optical element for positioning thereof; and
        means for interconnecting the second rotatable cam with the second motor and comprising a flexible coupling.

4. Apparatus according to claim 3 and wherein said second rotatable cam is in the form of a generally circular ring of varying width.

5. Apparatus according to claim 1 and also comprising:
    means for supporting the optical element for rotation about a second axis;
    means for selectably positioning the optical element about the second axis and including:
        a second rotatable cam having a cam surface, a dimension of which varies along its extent and determines the position of the optical element about the second axis;
        a second motor for determining the rotational orientation of the second rotatable cam and thus determining which portion thereof is in operative engagement with the optical element for positioning thereof; and
        means for interconnecting the second rotatable cam with the second and motor and comprising a flexible coupling.

6. Apparatus according to claim 5 and wherein said second rotatable cam is in the form of a generally circular ring of varying width.

7. Apparatus according to claim 5 and wherein said second axis is perpendicular to the first axis.

8. Apparatus according to claim 1 and also comprising:
    means for supporting the optical element for rotation about a second axis;
    means for selectably positioning the optical element about the second axis and including:
        a second rotatable cam having a cam surface, a dimension of which varies along its extent and determines the position of the optical element about the first axis;
        a second motor for determining the rotational orientation of the second rotatable cam and thus determining which portion thereof is in operative engagement with the optical element for positioning thereof; and
        means for interconnecting the second rotatable cam with the second motor and comprising a flexible coupling.

9. Apparatus according to claim 1 and wherein said motor comprises a step motor.

10. Apparatus according to claim 1 and wherein said means for interconnecting comprises a flexible coupling.

11. optical apparatus comprising:
    an optical element;
    means for supporting said optical element for rotation about a first axis; and
    means for selectably positioning the optical element about the first axis and including:
        a rotatable cam having a cam surface, a dimension of which varies along its extent and determines the position of the optical element about the first axis, said rotatable cam comprising a generally circular ring of varying width;
        a motor for determining the rotational orientation of the rotatable cam and thus determining which portion thereof is in operative engagement with the optical element for positioning thereof; and means for interconnecting the rotatable cam with the motor.

12. Apparatus according to claim 11 and wherein said means for interconnecting comprises radially extending leaf springs connecting the generally circular ring to a mounting hub associated with the motor.

13. Apparatus according to claim 14 and also comprising:
   means for supporting the optical element for rotation about a second axis;
   means for selectably positioning the optical element about the second axis and including:
      a second rotatable cam having a cam surface, a dimension of which varies along its extent and determines the posititon of the optical element about the second axis;
      a second motor for determining the rotational orientation of the second rotatable cam and thus determining which portion thereof is in operative engagement with the optical element for positioning thereof; and
      means for interconnecting the second rotatable cam with the second motor and comprising a flexible coupling.

14. Apparatus according to claim 13 and wherein said second rotatable cam is in the form of a generally circular ring of varying width.

15. Apparatus according to claim 11 and wherein said means for interconnecting comprises radially extending leaf springs connecting the generally circular ring to a mounting hub associated with the second motor.

16. Apparatus according to claim 11 and wherein said second axis is perpendicular to the first axis.

17. Apparatus according to claim 11 and wherein said motor comprises a step motor.

18. Apparatus according to claim 11 and wherein said means for interconnecting comprises a flexible coupling.

* * * * *